United States Patent
Myochin et al.

(10) Patent No.: US 11,214,182 B2
(45) Date of Patent: Jan. 4, 2022

(54) HEADREST

(71) Applicant: TACHI-S CO., LTD., Tokyo (JP)

(72) Inventors: Keita Myochin, Tokyo (JP); Naoki Toda, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/903,897

(22) Filed: Jun. 17, 2020

(65) Prior Publication Data

US 2020/0398721 A1   Dec. 24, 2020

(30) Foreign Application Priority Data

Jun. 18, 2019 (JP) .............................. JP2019-112926

(51) Int. Cl.
| | | |
|---|---|---|
| *B60N 2/888* | (2018.01) | |
| *B60N 2/803* | (2018.01) | |
| *B60N 2/891* | (2018.01) | |
| *B60N 2/80* | (2018.01) | |

(52) U.S. Cl.
CPC ............. *B60N 2/803* (2018.02); *B60N 2/888* (2018.02); *B60N 2/891* (2018.02); *B60N 2002/899* (2018.02)

(58) Field of Classification Search
CPC .................................. B60N 2/888; B60N 2/803
See application file for complete search history.

(56) References Cited

U.S. PATENT DOCUMENTS

| | | | | |
|---|---|---|---|---|
| 3,528,703 | A  * | 9/1970 | Seizho ................... | B60N 2/888 297/391 |
| 2008/0191522 | A1* | 8/2008 | Maeda ................... | B60N 2/888 297/216.12 |
| 2014/0183921 | A1* | 7/2014 | Hage-Hassan .......... | B60N 2/80 297/378.1 |
| 2016/0167551 | A1* | 6/2016 | Okamoto ............. | B60N 2/7017 297/391 |
| 2018/0236907 | A1* | 8/2018 | Ohno ................... | B60N 2/4228 |
| 2020/0391637 | A1* | 12/2020 | Jarsaeter ................ | B60N 2/838 |

FOREIGN PATENT DOCUMENTS

| | | | | | |
|---|---|---|---|---|---|
| DE | 2206329 | A1 * | 9/1972 | ............ | B60N 2/888 |
| DE | 102008045021 | B3 * | 10/2009 | ............ | B60N 2/888 |
| DE | 102008064348 | B3 * | 4/2010 | ............ | B60N 2/002 |
| DE | 102010049084 | A1 * | 4/2012 | ............ | B60N 2/806 |
| JP | 5654177 | B1 * | 1/2015 | ............ | B60N 2/888 |

(Continued)

*Primary Examiner* — Timothy J Brindley
(74) *Attorney, Agent, or Firm* — Paratus Law Group, PLLC

(57) ABSTRACT

A headrest includes a frame made of metal, the frame includes a base plate supported by a headrest fixing device, and a cover plate disposed on an occupant head side of the base plate. The cover plate includes a cover panel portion, and a cover frame portion extending from an outer circumferential edge of the cover panel portion toward the base plate. The base plate includes a base panel portion, and a base frame portion extending from an outer circumferential edge of the base panel portion toward the cover plate, and fitted into the cover frame portion. A first part of the cover frame portion is joined to the base frame portion, and a remaining second part of the cover frame portion is enjoined to the base frame portion.

4 Claims, 10 Drawing Sheets

(56) References Cited

FOREIGN PATENT DOCUMENTS

| JP | 2015-080976 A | 4/2015 | | |
|---|---|---|---|---|
| JP | 2016-011068 A | 1/2016 | | |
| WO | WO-2009001491 A1 * | 12/2008 | ............. | B60N 2/888 |
| WO | WO-2011154130 A2 * | 12/2011 | ............. | B60N 2/865 |
| WO | WO-2020130050 A1 * | 6/2020 | ............... | A47C 7/38 |

* cited by examiner

HEADREST

CROSS REFERENCE TO RELATED APPLICATIONS

This application claims priority to Japanese Patent Application No. 2019-112926 filed on Jun. 18, 2019, the content of which is incorporated herein by reference.

BACKGROUND

Field of the Invention

The present invention relates to a headrest for a vehicle seat.

Related Art

A headrest described in JP-2015-80976-A includes an impact absorber made of resin. The impact absorber is hollow, and a front portion of the impact absorber has an easily deformable bellows shape. When an impact force is applied by the head of an occupant, firstly, the bellows-shaped front portion deforms, and then the impact absorber compress to absorb the impact.

A headrest described in JP-2016-11068-A includes an energy absorbing member made of resin. The energy absorbing member includes a corrugated plate portion and a receiving plate portion disposed behind the corrugated plate portion. When an impact force is applied by the head of an occupant, the corrugated plate portion deforms to absorb the impact.

The impact absorber described in JP-2015-80976-A and the energy absorbing member described in JP-2016-11068-A both absorb the impact by deformation, and both are made of resin and elastically deform. Such absorbers generate a repulsive force after the impact subsides, and may push the head of the occupant forward.

SUMMARY

Illustrative aspects of the present invention provide a headrest with an excellent impact absorbing ability.

According to an illustrative aspect of the present invention, a headrest includes a frame made of metal, the frame includes a base plate supported by a headrest fixing device, and a cover plate disposed on an occupant head side of the base plate. The cover plate includes a cover panel portion, and a cover frame portion extending from an outer circumferential edge of the cover panel portion toward the base plate. The base plate includes a base panel portion, and a base frame portion extending from an outer circumferential edge of the base panel portion toward the cover plate, and fitted into the cover frame portion. A first part of the cover frame portion is joined to the base frame portion, and a remaining second part of the cover frame portion is enjoined to the base frame portion.

DETAILED DESCRIPTION OF THE EXEMPLARY EMBODIMENTS

Figure 1:
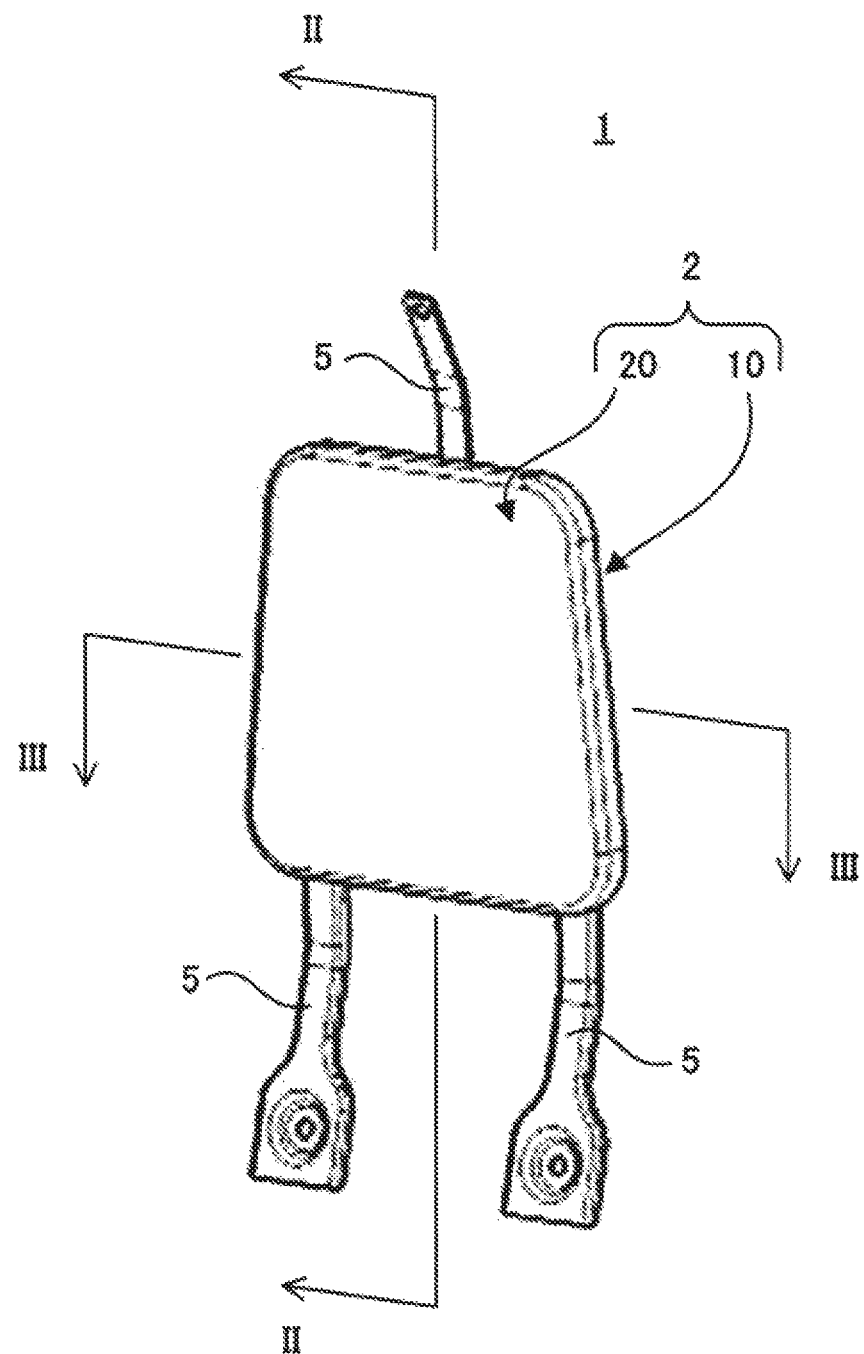
FIG. 1 is a perspective view showing a headrest for a vehicle seat according to an embodiment of the present invention.
Figure 2:
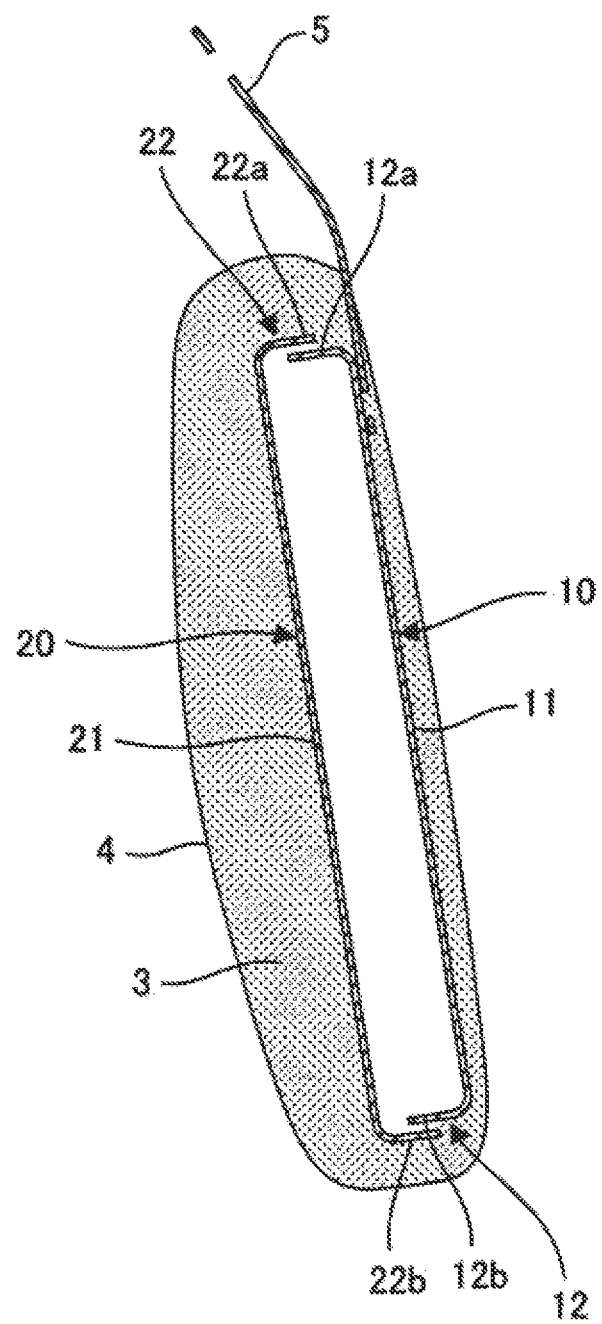
FIG. 2 is a sectional view of the headrest shown in FIG. 1 taken along line II-II.
Figure 3:
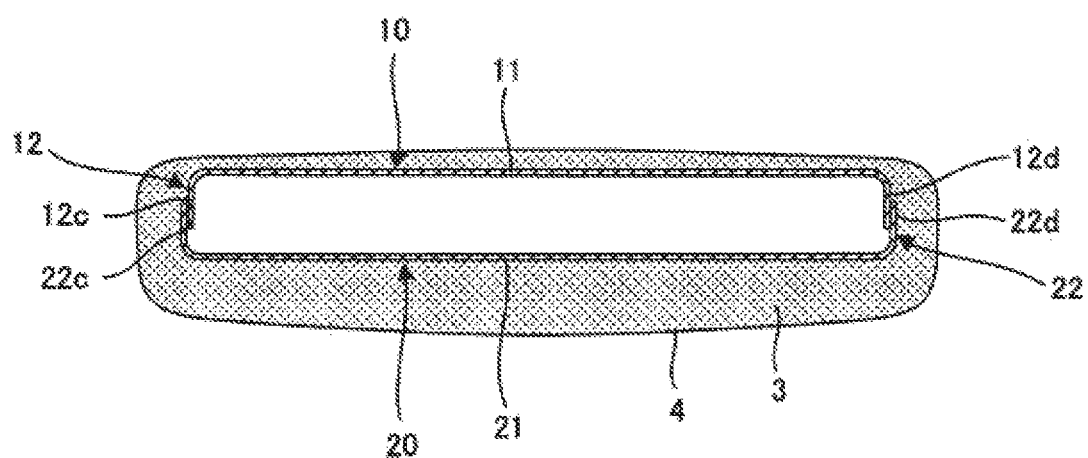
FIG. 3 is a sectional view of the headrest shown in FIG. 1 taken along line III-III.

FIGS. 1 to 3 show a headrest for a vehicle seat according to an embodiment of the present invention.

A headrest 1 is a headrest for a seat installed in a vehicle such as an automobile, and in particular, is a headrest for a seat installed in a vehicle (for example, a truck or the like) having a panel that separates a cargo bed from a cabin where the seat is installed, and is fixed to the panel.

The headrest 1 includes a frame 2 as a framework of the headrest, a cushion pad 3 covering the frame 2, a trim cover 4 covering the cushion pad 3, and a bracket (headrest fixing device) 5 fixing the headrest 1 to the panel. The cushion pad 3 is made of a relatively soft resin foam, and the resin foam is, for example, urethane foam or the like. The trim cover 4 is formed by sewing a plurality of skin materials in a bag shape, and the skin material is, for example, leather (natural leather, synthetic leather), woven fabric, non-woven fabric, knit or the like.

The frame 2 includes a base plate 10 and a cover plate 20. The base plate 10 and the cover plate 20 are plate members made of metal such as steel. The bracket 5 is joined to the base plate 10 and fixed to the panel. The base plate 10 is supported by the bracket 5 fixed to the panel. The headrest fixing device is not limited to the bracket 5, and may be a stay having a crushed shape at an end portion thereof. The cover plate 20 is disposed on an occupant head side of the base plate 10, and is assembled to the base plate 10.

The cover plate 20 includes a cover panel portion 21 and a cover frame portion 22. The cover panel portion 21 has a rectangular shape having an upper edge, a lower edge, and a pair of side edges, and has a flat plate shape. The cover frame portion 22 extends from an outer circumferential edge (the upper edge, the lower edge, and the pair of side edges) of the cover panel portion 21 toward the base plate 10, and includes an upper portion 22a extending along the upper edge of the cover panel portion 21, a lower portion 22b extending along the lower edge of the cover panel portion 21, and a pair of side portions 22c, 22d extending along respective ones of the pair of side edges of the cover panel portion 21.

The base plate 10 includes a base panel portion 11 and a base frame portion 12. Similarly to the cover panel portion 21, the base panel portion 11 has a rectangular shape having an upper edge, a lower edge, and a pair of side edges, and has a flat plate shape. The base frame portion 12 extends from an outer circumferential edge (the upper edge, the lower edge, and the pair of side edges) of the base panel portion 11 toward the cover plate 20, and includes an upper portion 12a extending along the upper edge of the base panel portion 11, a lower portion 12h extending along the lower edge of the base panel portion 11, and a pair of side portions 12c, 12d extending along respective ones of the pair of side edges of the base panel portion 11.

The base frame portion 12 is fitted into the cover frame portion 22, and the base frame portion 12 and the cover frame portion 22 are joined to each other. A method for joining the base frame portion 12 and the cover frame portion 22 is, for example, welding. However, a first part of the cover frame portion 22 is joined to the base frame portion 12, and a remaining second part of the cover frame portion 22 is enjoined to the base frame portion 12.

In the embodiment shown in FIGS. 1 to 3, the pair of side portions 22c, 22d of the cover frame portion 22 are joined to the pair of side portions 12c, 12d of the base frame portion 12. The upper portion 22a of the cover frame portion 22 is unjoined to the upper portion 12a of the base frame portion 12, and is spaced apart from the upper portion 12a. Further, the lower portion 22b of the cover frame portion 22 is unjoined to the lower portion 12b of the base frame portion 12, and is spaced apart from the lower portion 12b.

Figure 4:
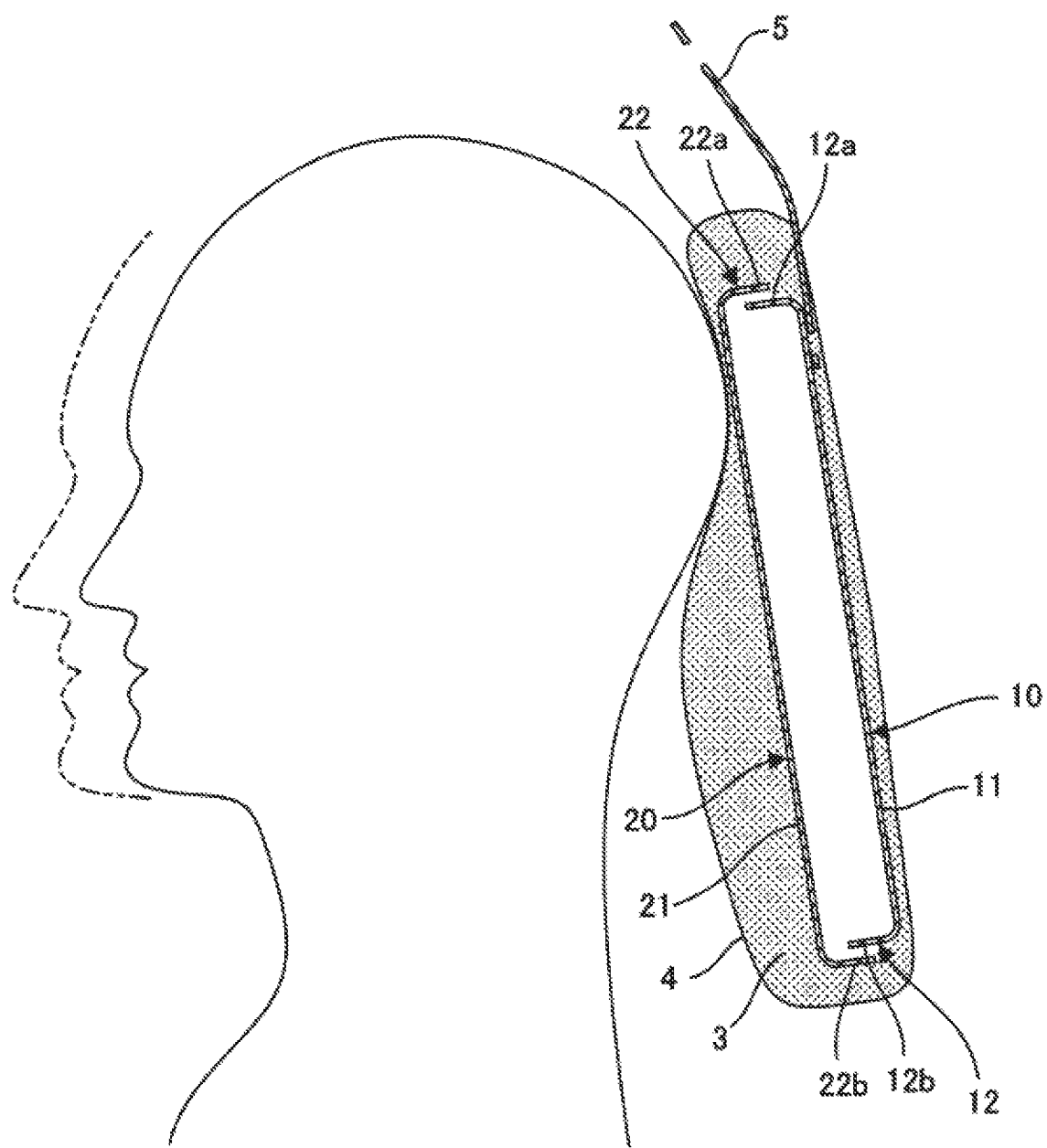
FIG. 4 is a schematic view illustrating operation of the headrest shown in FIG. 1.
Figure 5:
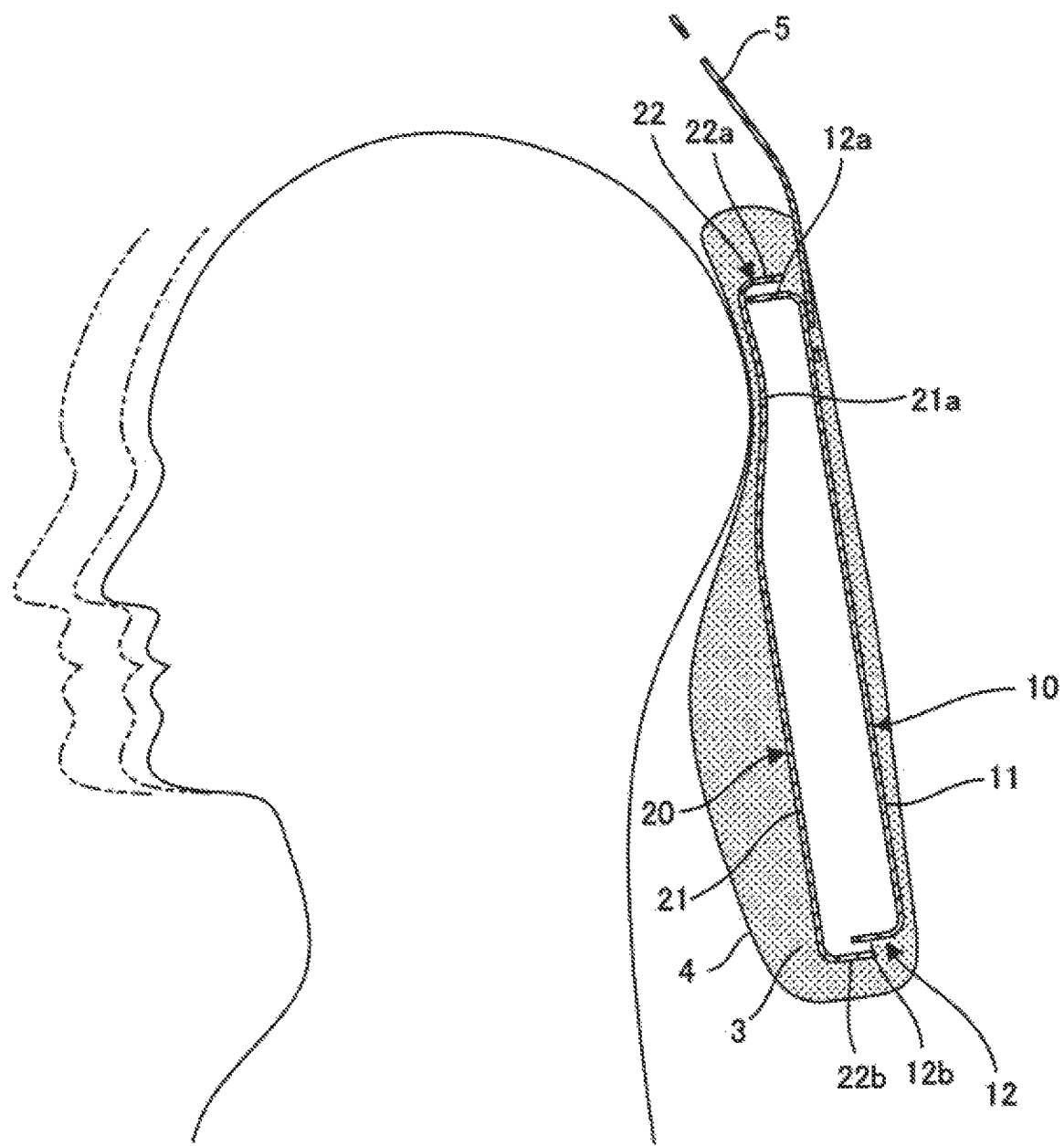
FIG. 5 is a schematic view illustrating the operation of the headrest shown in FIG. 1.

FIGS. 4 and 5 illustrate operation of the headrest 1.

The headrest 1 is commonly fixed at a height at which an upper part 21a of the cover panel portion 21 is behind the head of an occupant. The occupant is assumed to be an adult of standard physique. As shown in FIG. 4, at the time of a vehicle collision, the head of the occupant is displaced rearward and is pressed against the cover plate 20. A load applied to the cover plate 20 is mainly input to the upper part 21a of the cover panel portion 21.

As shown in FIG. 5, unjoined portions (the upper portion 12a and the upper portion 22a, the lower portion 12b and the lower portion 22b) of the base frame portion 12 and the cover frame portion 22 are allowed to shift in a fitting direction of the base frame portion 12 and the cover frame portion 22 due to the load applied to the cover plate 20. Accordingly, the base plate 10 and the cover plate 20 deform easily, absorbing a part of the collision energy.

When the unjoined portions of the base frame portion 12 and the cover frame portion 22 shift in the fitting direction, a distal end of the base frame portion 12 that is fitted in the cover frame portion 22 comes into contact with the cover panel portion 21 at the unjoined portions. Thereafter, the base plate 10 and the cover plate 20 further deform with the inclining and/or bending of the base frame portion 12 that is in contact with the cover panel portion 21, further absorbing the collision energy.

The base plate 10 and the cover plate 20 are made of metal, and the deformation of the base plate 10 and the cover plate 20 is plastic deformation. The plastic deformation of the base plate 10 and the cover plate 20 generates no repulsive force or suppresses the generation of the repulsive force after the impact subsides. Accordingly, the impact absorbing ability of the headrest 1 increases.

The distal end of the base frame portion 12 is directed toward the head of the occupant, but the base frame portion 12 is fitted in the cover frame portion 22, and the distal end of the base frame portion 12 is covered by the cover panel portion 21. Therefore, even if the base plate 10 and the cover plate 20 deform, the distal end of the base frame portion 12 never protrude from the cover panel portion 21, and the base plate 10 and the cover plate 20 satisfy safety requirements.

Here, in the present embodiment, the load applied to the cover plate 20 is mainly input to the upper part 21a of the cover panel portion 21. The upper portion 22a of the cover frame portion 22 adjacent to the upper part 21a is unjoined to the upper portion 12a of the base frame portion 12, and the upper portion 12a and the upper portion 22a shift easily in the fitting direction. This promotes the deformation of the base plate 10 and the cover plate 20 due to the input load. Further, the input load is effectively transmitted to the upper portion 12a in a state where the upper portion 12a, shifted in the fitting direction, is in contact with the cover panel portion 21. This promotes the inclining and/or bending of the upper portion 12a. Promoting the deformation of the base plate 10 and the cover plate 20 and promoting the inclining and/or bending of the upper portion 12a further increase the impact absorbing ability of the headrest 1.

When the upper portion 12a of the base frame portion 12 and the upper portion 22a of the cover frame portion 22 are unjoined, the pair of side portions 12c, 12d of the base frame portion 12 and the pair of side portions 22c, 22d of the cover frame portion 22 are preferably joined. This provides stability of the cover plate 20 as compared with the case where the cover plate 20 is assembled to the base plate 10 by joining the lower portion 12b of the base frame portion 12 and the lower portion 22b of the cover frame portion 22. Note that the lower portion 12b and the lower portion 22b may be unjoined as in the present embodiment, or may be joined.

From a viewpoint of promoting the inclining and/or bending of the base frame portion 12 at the unjoined portions, a thickness of the base plate 10 is preferably equal to or less than a thickness of the cover plate 20. The relatively thin base plate 10 further promotes the inclining and/or bending of the base frame portion 12, and further increases the impact absorbing ability of the headrest 1.

Figure 6:
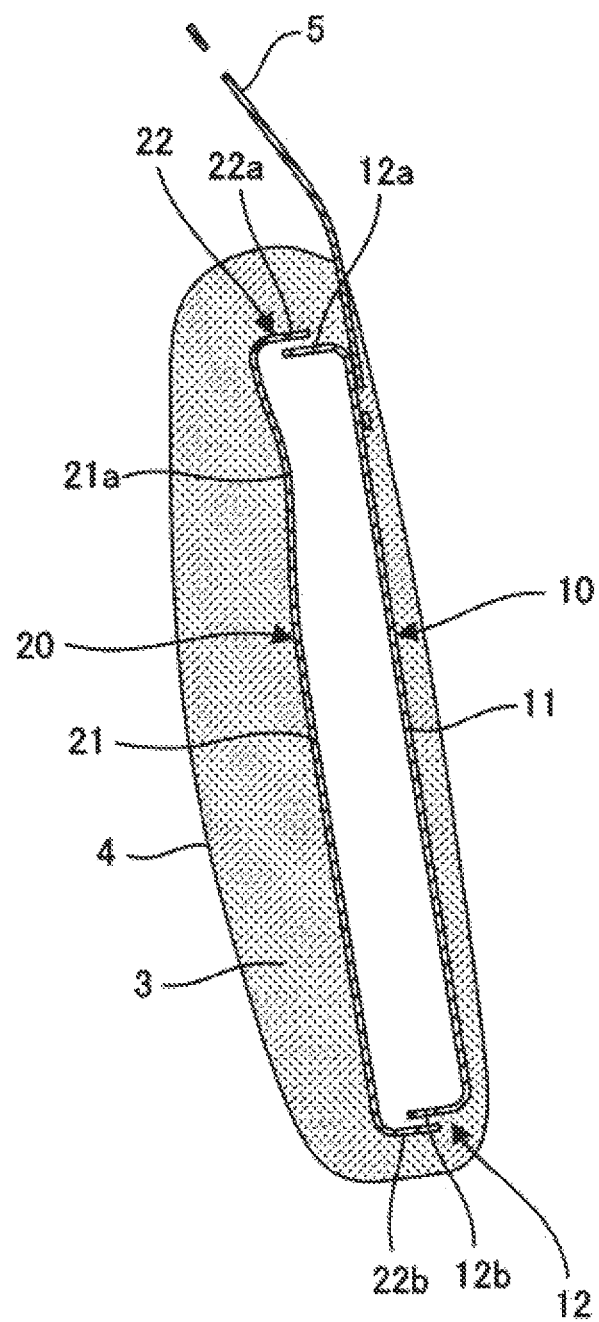
FIG. 6 is a sectional view showing a headrest according to another embodiment of the present invention.

FIG. 6 shows a headrest according to another embodiment of the invention, in which the upper part 21a of the cover panel portion 21 is concavely curved in accordance with a shape of the head of an occupant. This provides load dispersal and impact reduction when the head of the occupant is pressed onto the cover panel portion 21.

Figure 7:
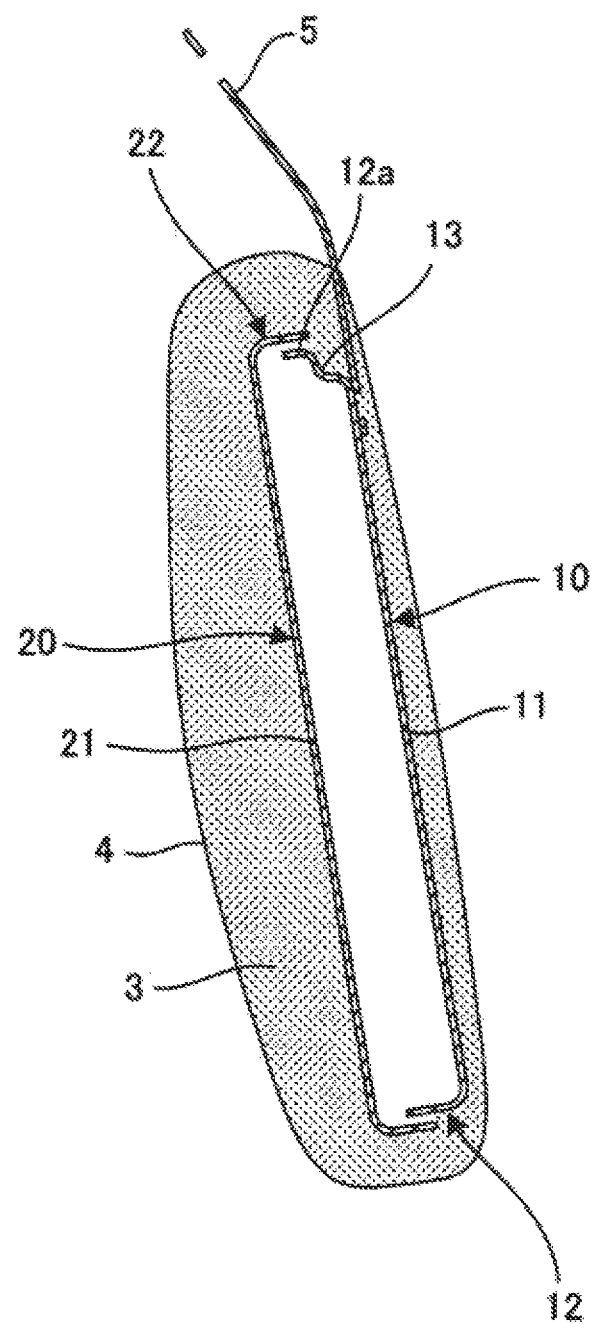
FIG. 7 is a sectional view showing a headrest according to still another embodiment of the present invention.

FIG. 7 shows a headrest according to still another embodiment of the invention, in which the base frame portion 12 has a bent portion 13 between a distal end portion and a base end portion connected to the base panel portion 11. The bent portion 13 serves as a starting point in the inclining and/or bending of the base frame portion 12. The bent portion 13 further promotes the inclining and/or bending of the base frame portion 12, and further increases the impact absorbing ability of the headrest 1. A plurality of bent portions 13 may be provided between the base end portion and the distal end portion of the base frame portion 12. The bent portion 13 is to be provided at least at an unjoined portion (upper portion 12a) of the base frame portion 12.

Figure 8:
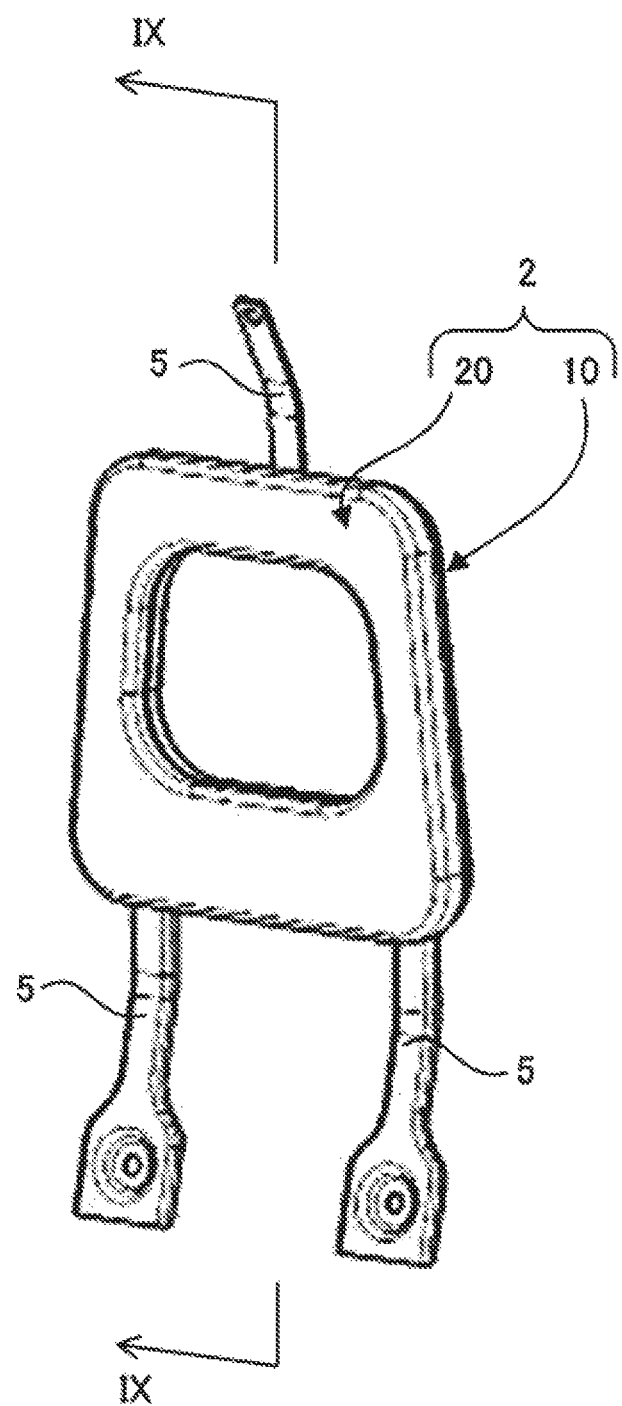
FIG. 8 is a perspective view showing a headrest according to still another embodiment of the present invention.
Figure 9:
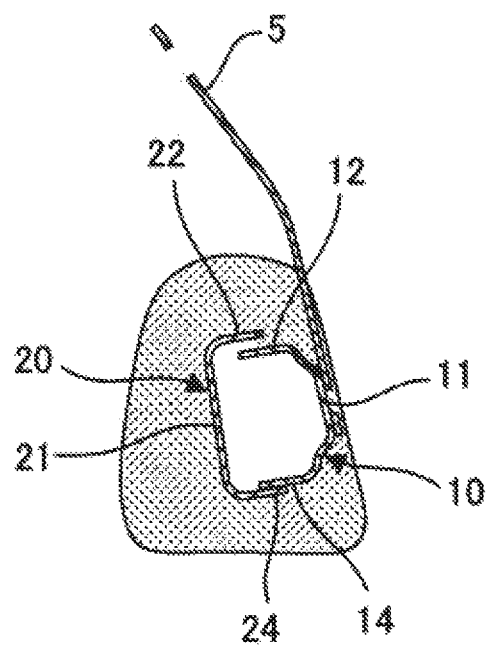
FIG. 9 is a sectional view of the headrest shown in FIG. 8 taken along line IX-IX.
Figure 9:
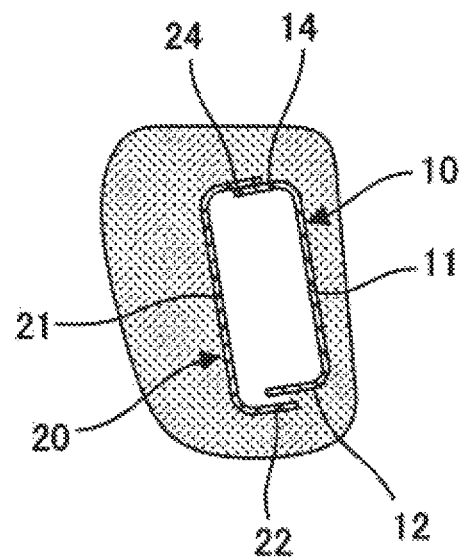
Figure 10:
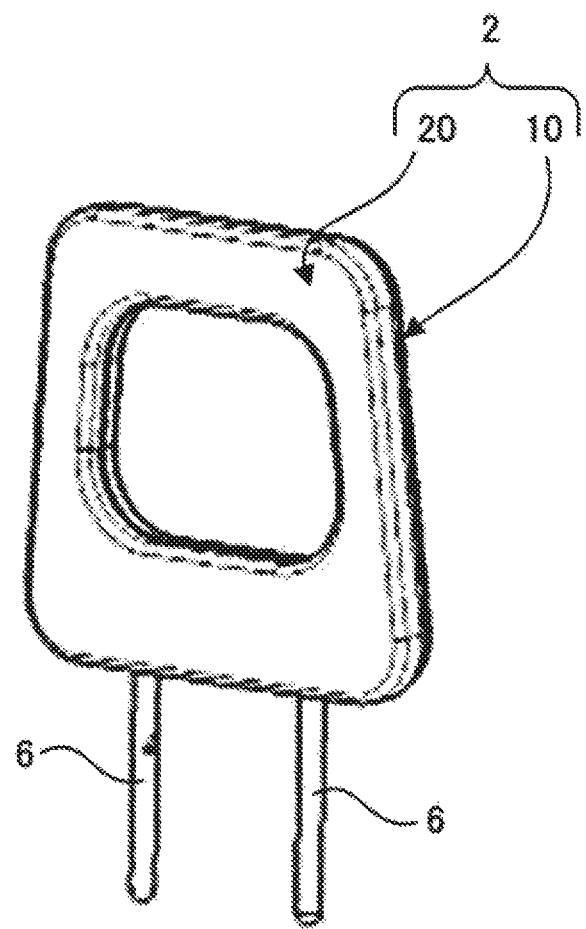
FIG. 10 is a perspective view showing a headrest according to still another embodiment of the present invention.

The base plate 10 and the cover plate 20 are not limited to the shape shown in FIGS. 1 and 2, and may have an annular shape as shown in FIGS. 8 and 9, for example. In the example shown in FIGS. 8 and 9, the base panel portion 11 and the cover panel portion 21 have the annular shape, the base plate 10 includes a base inner frame portion 14 extending from an inner circumferential edge of the base panel portion 11, and the cover plate 20 includes a cover inner frame portion 24 extending from an inner circumferential edge of the cover panel portion 21. The base inner frame portion 14 is disposed between the cover frame portion 22 and the cover inner frame portion 24 and is fitted to the cover inner frame portion 24, and a distal end of the base inner frame portion 14, which is directed toward the head of an occupant, is covered by the cover panel portion 21.

The base inner frame portion 14 and the cover inner frame portion 24 may be joined to each other. In this case, the entire cover inner frame portion 24 may be joined to the base inner frame portion 14, or a part of the cover inner frame portion 24 is joined to the base inner frame portion 14, and a remaining part of the cover inner frame portion 24 is unjoined to the base inner frame portion 14. Alternatively, the entire cover inner frame portion 24 may be unjoined to the base inner frame portion 14.

FIGS. 1 and 2 and FIGS. 8 and 9 illustrate the bracket 5 as the headrest fixing device, but the headrest fixing device may be a pair of or a single stay 6. The headrest 1 is fixed to a seat back (not shown) of the seat with a pair of or a single stay 6.

As described above, the present invention has been described by taking the headrest 1 for a seat mounted on a vehicle such as an automobile as an example. However, the configuration of the headrest 1 can also be applied to a headrest for a vehicle seat mounted on other vehicles such as an aircraft or a ship.

According to the embodiments of the invention described above, a headrest for a vehicle seat includes a frame made of metal, in which the frame includes a base plate supported by a headrest fixing device, and a cover plate disposed on an occupant head side of the base plate. The cover plate includes a cover panel portion, and a cover frame portion extending from an outer circumferential edge of the cover panel portion toward the base plate. The base plate includes a base panel portion, and a base frame portion extending from an outer circumferential edge of the base panel portion toward the cover plate, and fitted into the cover frame portion. A first part of the cover frame portion is joined to the base frame portion; and a remaining second part of the cover frame portion is unjoined to the base frame portion.

The cover panel portion may have a rectangular shape having an upper edge, a lower edge, and a pair of side edges. The cover frame portion may include an upper portion extending along the upper edge of the cover panel portion. The remaining second part of the cover frame portion may include the upper portion, and the upper portion may be unjoined to the base frame portion.

The cover frame portion may include a pair of side portions extending along respective ones of the pair of side edges of the cover panel portion. The first part of the cover frame portion may include the pair of side portions, and the pair of side portions may be joined to the base frame portion.

A thickness of the base plate may be equal to or less than a thickness of the cover plate.

The base frame portion may include one or more bent portions between a distal end portion and a base end portion connected to the base panel portion.

What is claimed is:

1. A headrest for a vehicle seat, comprising a frame made of metal,
   the frame including:
   a base plate supported by a headrest fixing device; and
   a cover plate disposed on an occupant head side of the base plate,
   the cover plate including:
   a cover panel portion; and
   a cover frame portion extending from an outer circumferential edge of the cover panel portion toward the base plate,
   the base plate including:
   a base panel portion; and
   a base frame portion extending from an outer circumferential edge of the base panel portion toward the cover plate, and fitted into the cover frame portion,
   wherein a first part of the cover frame portion is joined to the base frame portion,
   wherein a remaining second part of the cover frame portion is unjoined to the base frame portion,
   wherein the cover panel portion has a rectangular shape having an upper edge, a lower edge, and a pair of side edges,
   wherein the cover frame portion includes an upper portion extending along the upper edge of the cover panel portion, and
   wherein the remaining second part of the cover frame portion includes the upper portion, which is unjoined to the base frame portion.

2. The headrest according to claim 1,
   wherein the cover frame portion includes a pair of side portions extending along respective ones of the pair of side edges of the cover panel portion, and
   wherein the first part of the cover frame portion includes the pair of side portions, which is joined to the base frame portion.

3. The headrest according to claim 1,
   wherein a thickness of the base plate is equal to or less than a thickness of the cover plate.

4. The headrest according to claim 1,
   wherein the base frame includes a base end portion connected to the base panel portion, a distal end portion, and one or more bent portions between the distal end portion and the base end portion.

* * * * *